US012228258B2

(12) United States Patent
Krotmeier et al.

(10) Patent No.: US 12,228,258 B2
(45) **Date of Patent: *Feb. 18, 2025**

(54) LINEAR LUMINAIRE INCLUDING A LIGHT INSET INSERTED IN A CHANNEL

(71) Applicant: Diem GmbH, Graz (AT)

(72) Inventors: Stefan Krotmeier, New York, NY (US); Dominic Hosch, New York, NY (US); Moritz Gessner, Graz (AT); Rene Hendler, Stattegg (AT)

(73) Assignee: DIEM GmbH, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,666

(22) Filed: Nov. 15, 2023

(65) Prior Publication Data

US 2024/0084984 A1 Mar. 14, 2024

Related U.S. Application Data

(63) Continuation of application No. 17/895,162, filed on Aug. 25, 2022, now Pat. No. 11,852,309, which is a (Continued)

(51) Int. Cl.
*F21S 4/28* (2016.01)
*F21V 3/02* (2006.01)
(Continued)

(52) U.S. Cl.
CPC .................. *F21S 4/28* (2016.01); *F21V 3/02* (2013.01); *F21V 17/164* (2013.01); *F21Y 2115/10* (2016.08)

(58) Field of Classification Search
CPC ...... F21Y 2115/10; F21V 17/164; F21V 3/02; F21V 4/28
See application file for complete search history.

(56) References Cited

U.S. PATENT DOCUMENTS

2015/0159848 A1 6/2015 Sieberth et al.
2017/0307152 A1 10/2017 Patel et al.

FOREIGN PATENT DOCUMENTS

DE 202012102874 U1 4/2013
DE 202014100946 U1 6/2015
(Continued)

OTHER PUBLICATIONS

Innovation Q+ NPL Search (Year: 2024).*
(Continued)

*Primary Examiner* — Anabel Ton
(74) *Attorney, Agent, or Firm* — Davidson Kappel LLC

(57) ABSTRACT

A linear luminaire includes a linear channel defining an interior space and a linear light inset configured for being inserted into the channel in the interior space. The light inset includes a cover and a printed circuit board fixed to the cover. The printed circuit board supports a plurality of light emitting diodes. The cover base wall includes a translucent portion. The light emitting diodes are arranged for emitting light through the translucent portion. The cover includes two cover connectors, each configured for being snapped into the channel to hold the cover in the interior space. The cover connectors are on an opposite side of the printed circuit board as the translucent portion.

18 Claims, 7 Drawing Sheets

Related U.S. Application Data continuation of application No. 17/527,111, filed on Nov. 15, 2021, now Pat. No. 11,493,179.

(51) Int. Cl.

| | |
|---|---|
| ***F21V 17/16*** | (2006.01) |
| ***F21Y 115/10*** | (2016.01) |

(56) References Cited

FOREIGN PATENT DOCUMENTS

| | | | | | |
|---|---|---|---|---|---|
| DE | 102018122554 | A1 | | 3/2020 | |
| DE | 202019103211 | U1 | * | 10/2020 | ................ F21S 4/28 |
| EP | 2924333 | A1 | | 9/2015 | |
| GB | 2475328 | A | * | 5/2011 | .......... E04F 11/1836 |
| WO | WO 2005/073629 | A1 | | 8/2005 | |

OTHER PUBLICATIONS

Brochure XAL—BASO 1.5 / 2.5 / 4.0 linear profiles; Nov. 2, 2020.
ISR and Written opinion of PCT/US2022/046261 dated Apr. 25, 2023.

* cited by examiner

LINEAR LUMINAIRE INCLUDING A LIGHT INSET INSERTED IN A CHANNEL

This is a Continuation of U.S. patent application Ser. No. 17/895,162, filed on Aug. 25, 2022 and published as U.S. 2023/0151935 A1, which is a Continuation of U.S. patent application Ser. No. 17/527,111, filed on Nov. 15, 2021 and was patented as U.S. Pat. No. 11,493,179 B1, all of which are hereby incorporated by reference herein.

The present disclosure relates generally to linear luminaires and more specifically to a linear luminaire including a light inset inserted in a channel.

BACKGROUND

Linear luminaires can be mounted directly to a ceiling or wall or can be supported on a pendant.

SUMMARY

A linear luminaire is provided that includes a linear channel defining an interior space and a linear light inset configured for being inserted into the channel in the interior space. The light inset includes a cover and a printed circuit board fixed to the cover. The printed circuit board supports a plurality of light emitting diodes. The cover base wall includes a translucent portion. The light emitting diodes are arranged for emitting light through the translucent portion. The cover includes two cover connectors, each configured for being snapped into the channel to hold the cover in the interior space. The cover connectors are on an opposite side of the printed circuit board as the translucent portion.

A linear luminaire is provided that includes a linear channel defining an interior space and a linear light inset configured for being inserted into the channel in the interior space. The light inset includes a cover and a printed circuit board fixed to the cover. The printed circuit board supports a plurality of light emitting diodes. The cover base wall includes a translucent portion. The light emitting diodes are arranged for emitting light through the translucent portion. The cover includes a first support section supporting the printed circuit board and a second support section configured for supporting a further printed circuit board. The second support section and the first support section are different distances from the translucent portion.

A linear luminaire is provided that includes a linear channel defining an interior space and a linear light inset configured for being inserted into the channel in the interior space. The light inset includes a cover and a printed circuit board fixed to the cover. The printed circuit board supports a plurality of light emitting diodes. The cover base wall includes a translucent portion. The light emitting diodes are arranged for emitting light through the translucent portion. The cover includes two cover connectors each configured for being connected to the channel to hold the cover in the interior space. The linear luminaire further includes a fall down protection fastener fixed to printed circuit board and configured for being fixed to the channel base wall to prevent the cover and printed circuit board from being disconnected from the channel upon failure of a connection of the cover connectors to the channel.

BRIEF DESCRIPTION OF THE DRAWINGS

The present invention is described below by reference to the following drawings, in which.

DETAILED DESCRIPTION

Figure 1A:
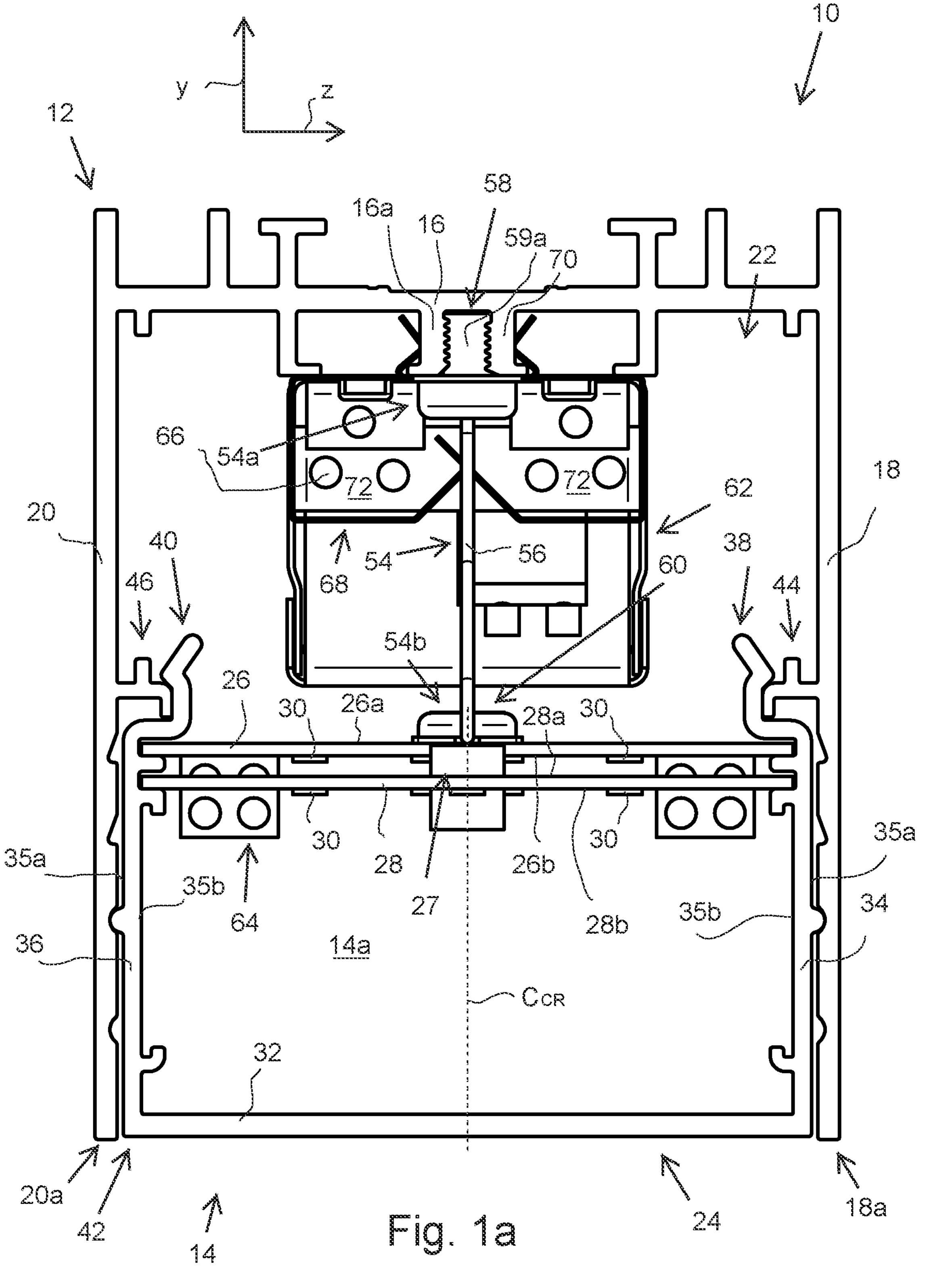
FIG. 1*a* shows a cross-sectional longitudinally facing view of a linear luminaire configured to be mounted directly to a ceiling or wall or can be supported on a pendant.
Figure 2:
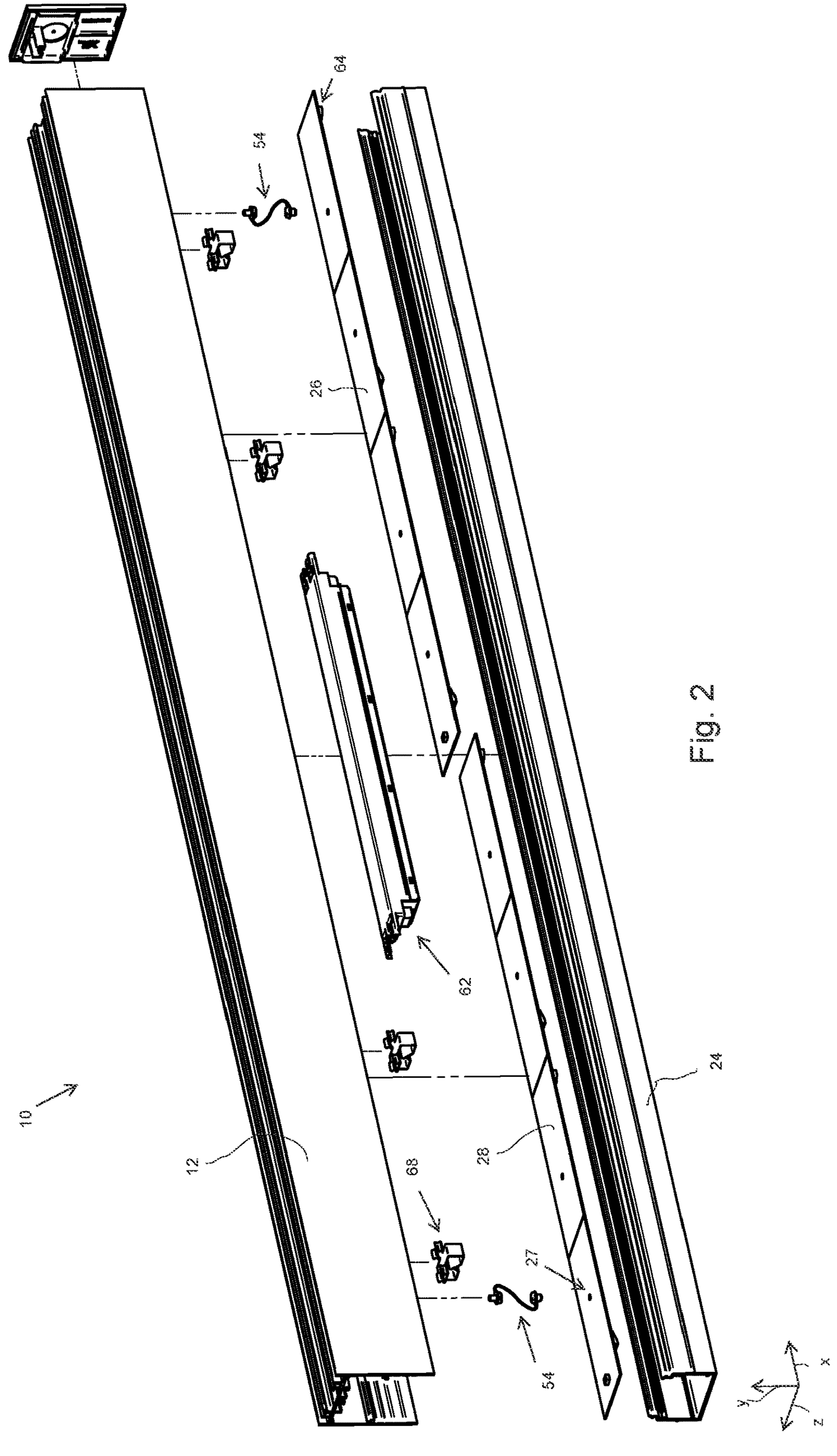
FIG. 2 shows an exploded view of the linear luminaire shown in FIGS. 1*a* and 1*b;*
Figure 3:
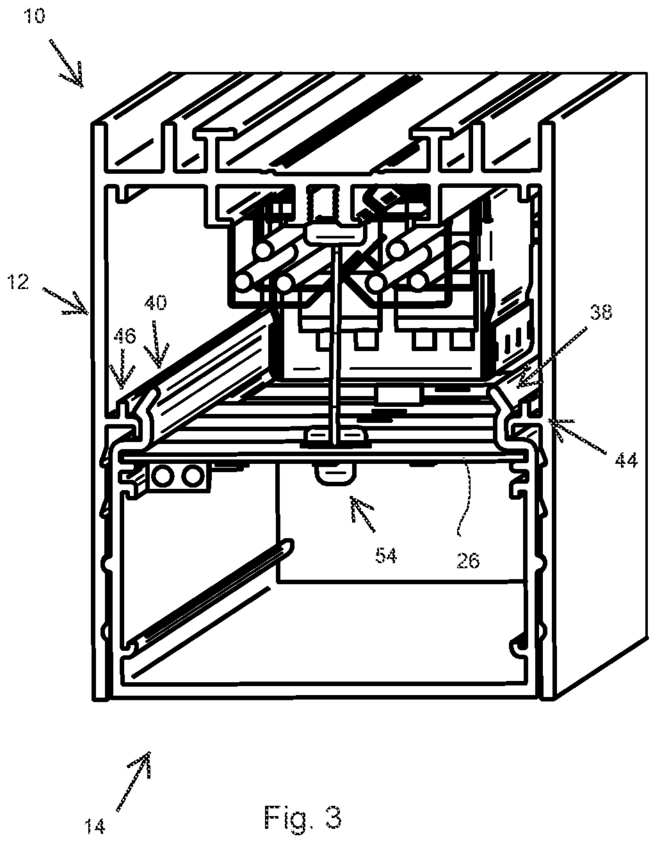
FIG. 3 shows a perspective view of a longitudinal end of the linear luminaire shown in FIGS. 1*a* to 2.

FIG. 1*a* shows a cross-sectional longitudinally facing view of a linear luminaire 10 configured to be mounted directly to a ceiling or wall, recessed in a ceiling or wall or can be supported on a pendant, and FIG. 2 shows an exploded view of linear luminaire 10. Terms used herein, including vertically, horizontally, higher, lower, above and below, unless otherwise stated, are used in reference to the orientation present when the luminaire 10 is mounted to the ceiling as an overhead light, or in the ceiling as a recessed light. Luminaire 10 includes a linear channel 12 and a linear light inset 14. Linear channel 12 includes a channel base wall 16 and two channel side walls 18, 20 extending away from base wall 16. When luminaire 10 is mounted to the ceiling as an overhead light, channel base wall 16 constitutes the top of the luminaire 10. Channel 12 may be formed by a single piece of a metal. In one example, channel 12 is formed of aluminum. In particular, channel 12 may be formed of extruded aluminum. In other examples, channel 12 may be formed as sheet metal parts that are welded together—i.e., with walls 16, 18, 20 as separate sheet metal parts that are welded together. In other examples, channel may also be formed of plastic.

Linear light inset 14 is configured for being inserted into channel 12 in a space 22 between the two channel side walls 18, 20. Light inset 14 includes a cover 24 and two printed circuit boards (PCBs) 26, 28 fixed to cover 24. PCBs 26, 28 each support a plurality of light sources in the form of light emitting diodes 30 to emit light through cover 24.

Cover 24 includes a cover base wall 32 and two cover side walls 34, 36 extending away from the cover base wall 32. PCBs 26, 28 are each fixed to the two cover side walls 34, 36. Cover base wall 32 forms a translucent portion, and LEDs 30 arranged for emitting light through cover base wall 32. Light inset 14 defines an interior space 14*a* between walls 32, 34, 36 and PCBs 26, 28 through which light travels before passing through cover base wall 32.

Cover 24 also includes two cover connectors 38, 40, and each of cover connectors 38, 40 is fixed to a respective one of the two cover side walls 34, 36. Cover connectors 38, 40 are configured for being snapped into the channel 12 to hold the cover 24 in the space 22 between the two channel side walls 18, 20. The connection by connectors 38, 40 to channel 12 prevents light insert 14 from falling downward from channel 12 through an opening 42 defined at lower ends 18*a*, 20*a* of channel side walls 18, 20.

Cover connectors 38, 40 are positioned above an upward facing side 26*a* of upper PCB 26—i.e., the side facing channel base wall 16, which is opposite a downward facing side 26*b* of upper PCB 26—i.e., the side facing cover base wall 32. LEDs 30 are fixed to downward facing side 26*b* of PCB 26. Each of cover connectors 38, 40 is formed integrally as a single piece with an end of the respective cover side wall 34, 36. Further, cover side walls 34, 36 are formed integrally as a single piece with cover base wall 32. In other words, cover base wall 32, cover side walls 34, 36 and cover connectors 38, 40 are formed integrally as a single piece to constitute cover 24. In one advantageous example, cover 24 may be formed of plastic and may have an opal color such that it is translucent, but not transparent. In other examples, cover 24 may be translucent and transparent or cover 24 may be translucent and colored.

Each of the two channel side walls 18, 20 includes a channel connector 44, 46. Each of cover connectors 38, 40 is configured for being snapped onto one of the channel connectors 44, 46 to create a form fit connection between the channel 12 and the cover.

Figure 1B:
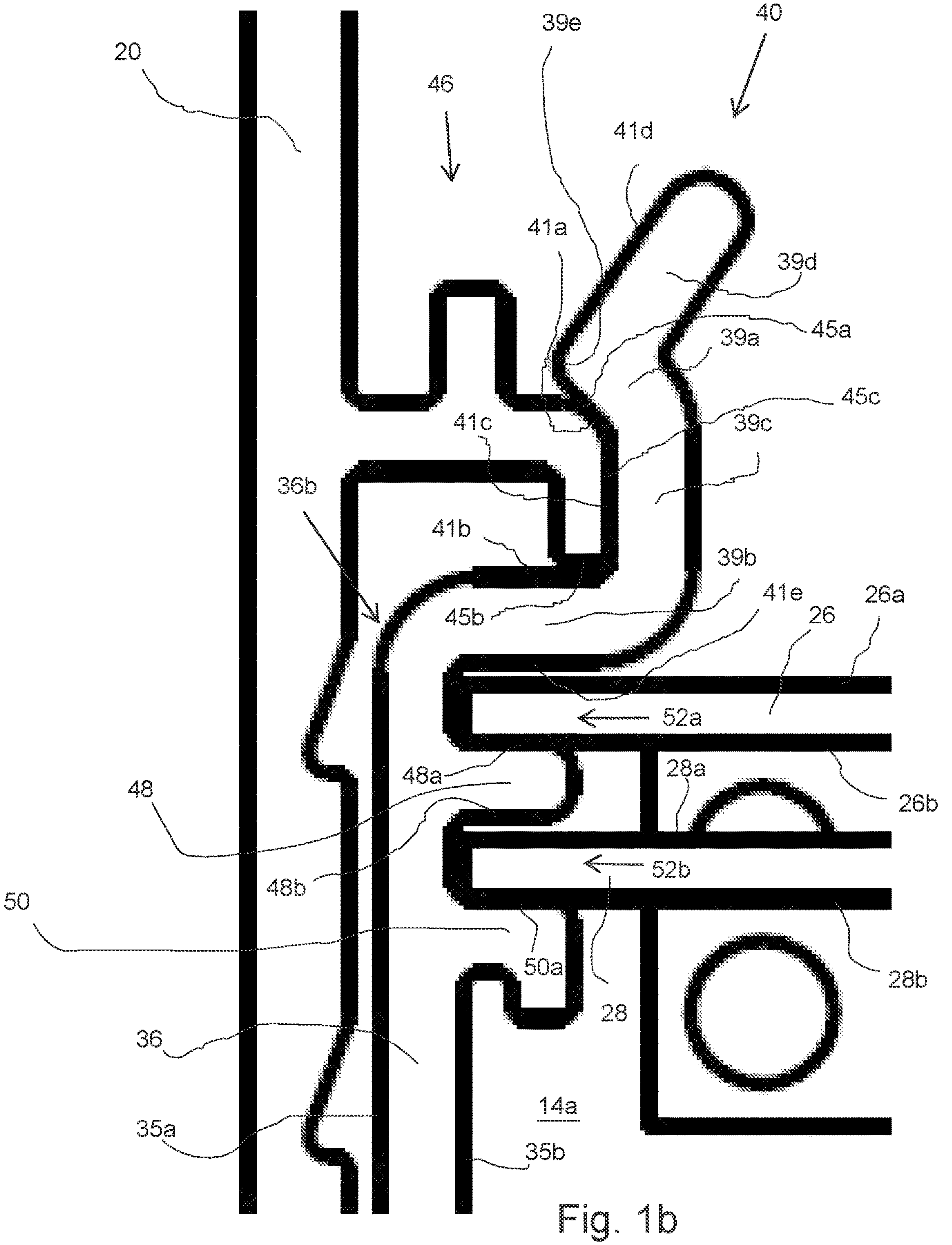
FIG. 1*b* shows an enlarged view of a portion of FIG. 1*a* illustrating the connectors.

FIG. 1*b* shows an enlarged section of a portion of FIG. 1*a* including cover connectors 40 and channel connector 46. The following discussion of connectors 40, 46 also applies to connectors 38, 44. Referring to FIGS. 1*a* and 1*b* together, each of cover connectors 38, 40 includes an outwardly extending section 39*a* extending horizontally away from a longitudinal center plane $C_{CR}$ of cover 24. Longitudinal center plane $C_{CR}$ of cover 24 extends along a length of cover 24. Outwardly extending sections 39*a* are each configured for contacting a securing surface 45*a* of the respective channel connector 44, 46 to prevent the cover 24 from falling out of the linear channel 12 and away from the channel base wall 16. More specifically, outer downwardly facing surfaces 41*a* of outwardly extending sections 39*a* contact securing surfaces 45*a*, respectively, to prevent the cover 24 from falling out of the linear channel 12 and away from the channel base wall 16. Outer downwardly facing surfaces 41*a* are inclined with respect to longitudinal center plane $C_{CR}$ such that surfaces 41*a* face away from longitudinal center plane $C_{CR}$ and also face downwardly toward the respective side wall 34, 36. In other words, outer downwardly facing surfaces 41*a* extend both vertically and horizontally. Securing surfaces 45*a* face upward toward the channel base wall 16 and also angle toward center plane $C_{CR}$, such that surfaces 45*a* also extend vertically while extending horizontally.

Each of cover connectors 38, 40 also includes an inwardly extending section 39*b* extending horizontally away from the respective cover side wall 34, 36 and toward the longitudinal center plane $C_{CR}$ of cover 24. Inwardly extending sections 39*b* are each configured for contacting a respective abutment surface 45*b* of the respective channel connector 44, 46 to prevent the cover 24 from being forced further into the linear channel 12 toward the channel base wall 16. More specifically, upwardly facing surfaces 41*b* of inwardly extending sections 39*b* are each configured for contacting a respective abutment surface 45*b* to prevent the cover 24 from being forced further into the linear channel 12 toward the channel base wall 16. Abutment surfaces 45*b* extend horizontally and face downwardly away from the channel base wall 16. Inwardly extending sections 39*b* also include horizontally extending downwardly facing surfaces 41*e* contacting or are at least directly facing surface 26*a* of PCB 26. Each of the inwardly extending sections 39*b* is formed integrally with an upper end 34*b*, 36*b* of the respective cover side wall 34, 36.

Each of cover connectors 38, 40 further includes an intermediate section 39*c* connecting inwardly extending section 39*b* to outwardly extending section 39*a*. Each of intermediate sections 39*c* is configured for laterally contacting an alignment surface 45*c* of the respective channel connector 38, 40 to center the cover 24 within the channel 12. Alignment surfaces 45*c* face toward each other. More specifically, each alignment surface 45*c* faces toward longitudinal center plane $C_{CR}$ and away from the respective channel side wall 18, 20 and extends vertically upward from the respective abutment surface 45*b* to the respective securing surface 45*a*.

Each of cover connectors 38, 40 additionally includes an insertion section 39*d* tapering inward from outwardly extending section 39*a* by extending horizontally toward longitudinal center plane $C_{CR}$ and horizontally away from the respective cover side wall 34, 36 while extending vertically toward channel base wall 16 and away from PCB 26. More specifically, each insertion section 39*d* includes an inclined surface 41*d* that extends horizontally and vertically away from surface 41*a* toward longitudinal center plane $C_{CR}$.

Each of cover side walls 34, 36 is also provided with two circuit board support sections including an upper support section 48 and a lower support section 50. Sections 48, 50 extend along an entire length of cover 24. Upper support section 48 vertically supports upper PCB 26 and lower support section 50 vertically supports lower PCB 28. Cover side walls 34, 36 include outer surfaces 35*a* facing away from light inset interior space 14*a* and toward the respective channel side walls 18, 20 and inner surfaces 35*b* facing toward interior space 14*a* and away from the respective side walls 18, 20. Support sections 48, 50 protrude horizontally inward from the respective inner surface 35*b* toward longitudinal center plane $C_{CR}$. Each of support sections 48, 50 includes a respective horizontally extending support surface 48*a*, 50*a* for contacting the lower surface 26*b*, 28*b* of the respective PCB 26, 28. Lateral ends 28*c* of PCB 28 are received in gaps 52*a* formed vertically between the respective support surface 50*a* and a respective lower horizontally extending surface 48*b* of support section 48, and lateral ends 26*c* of PCB 26 are received in gaps 52*b* formed vertically between the respective support surface 48*a* and the horizontally extending downwardly facing surfaces 41*e* of the respective cover connector 38, 40.

Figure 4B:
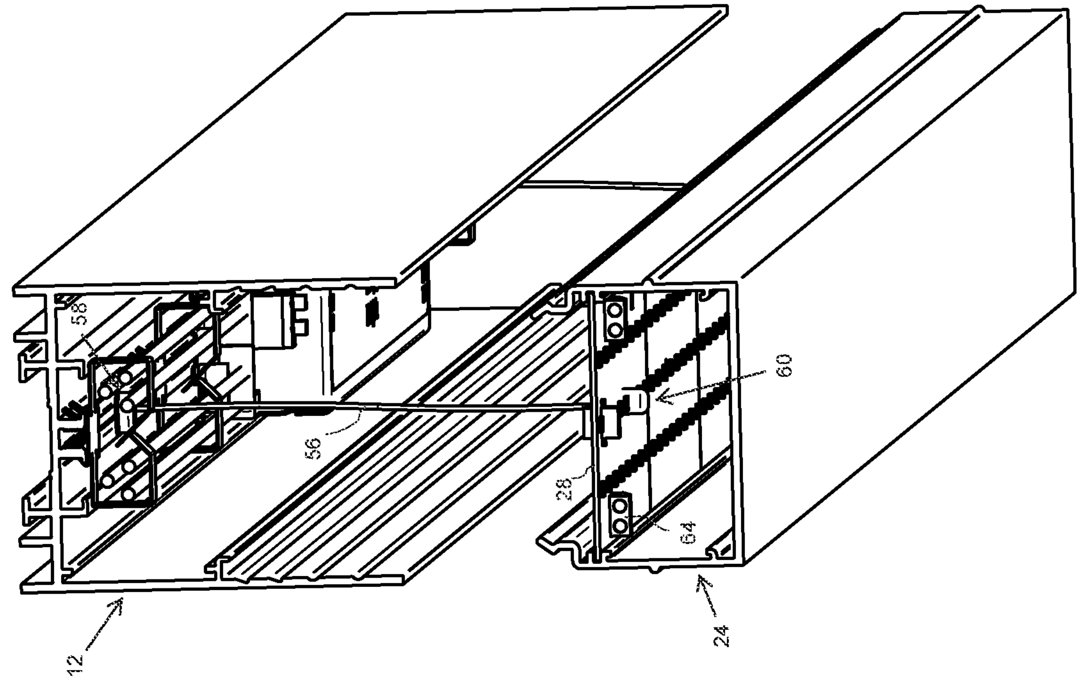
FIGS. 4*a* and 4*b* respectively show a downward facing and an upward facing perspective view of the linear luminaire shown in FIGS. 1*a* to 3.
Figure 4A:
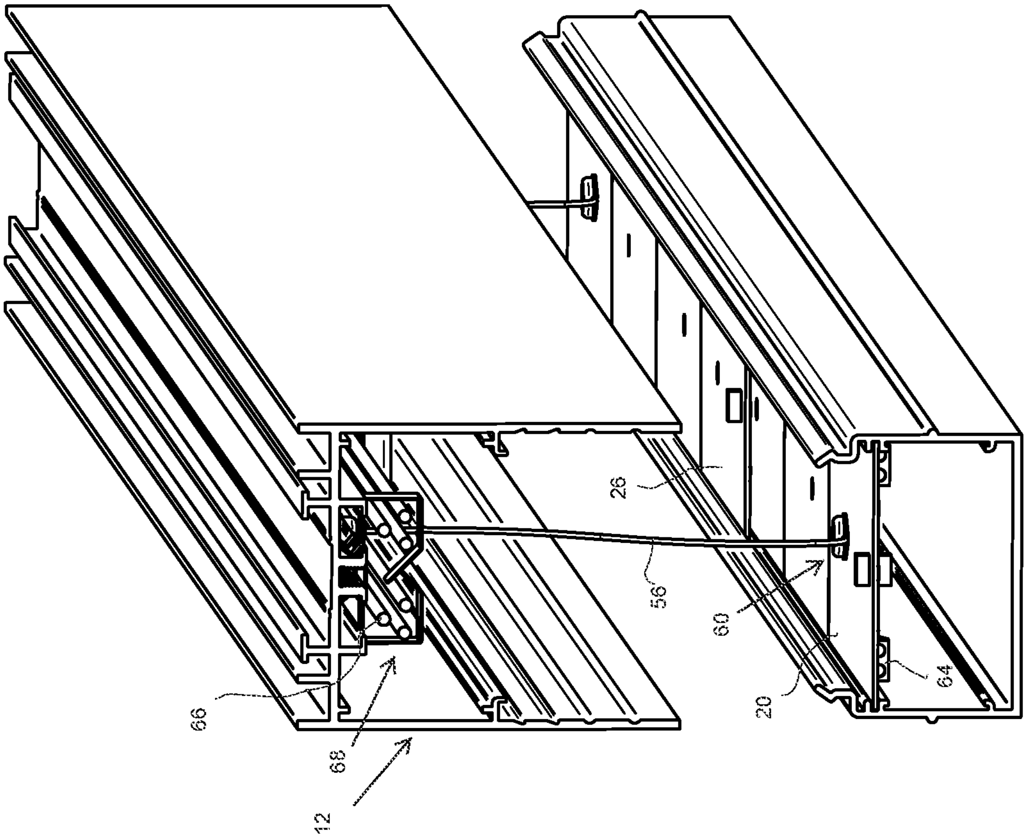
Figure 6:
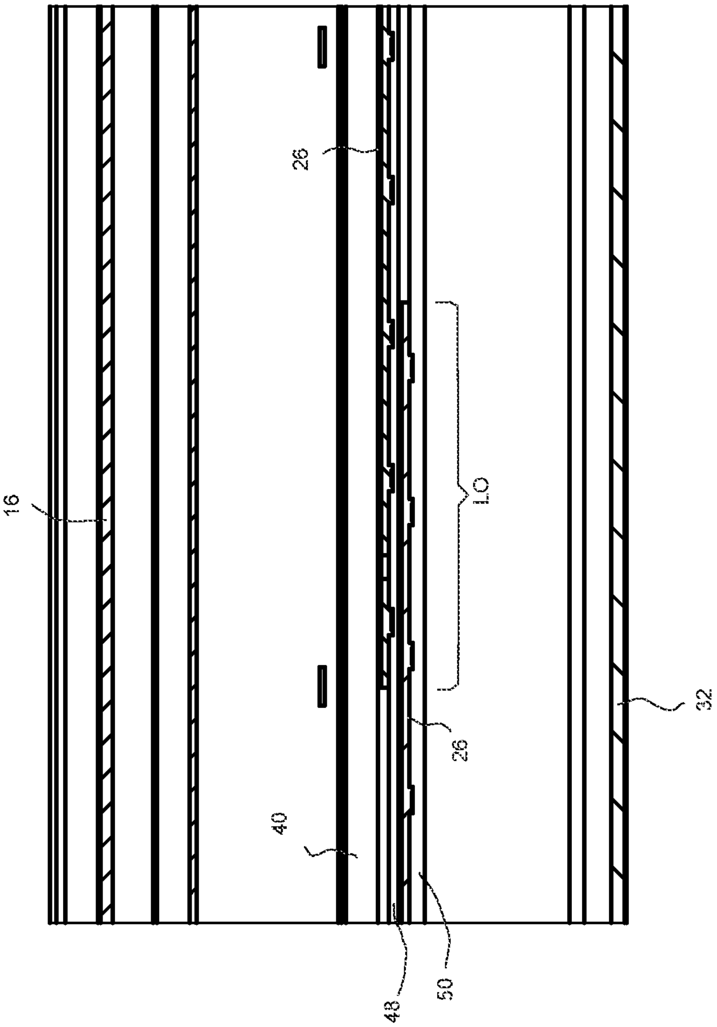
* and FIG. 6 shows a cross-sectional lateral facing view of the luminaire shown in FIGS. 1*a* to 5, illustrating a longitudinal overlap two printed circuit boards.

As shown in FIGS. 4*a* and 6, providing two different support sections 48, 50 at two different vertical positions provides flexibility during the installation of luminaire 10. In particular, for example, if a plurality of standard length PCBs 26 or 28 are used and luminaire is not an integer multiple of this standard length, PCBs 26, 28 can overlap with each other in the longitudinal direction. As an illustrative example, if each of PCBs 26, 28 are ten inches long, and luminaire has a length of forty-five inches, four different PCBs 26 can be provided on upper support sections 48 and a fifth PCB 28 can be provided on lower support sections 50 overlapped in the longitudinal direction by five inches with one of upper PCBs. FIG. 6 shows a cross-sectional lateral facing view of luminaire 10, illustrating a longitudinal overlap LO of an upper PCB 26 and a lower PCB 28.

As shown in FIGS. 1*a*, 2, 4*a*, 4*b* and 5, luminaire 10 further includes a fall down protection fastener 54 configured for being connected to channel base wall 16 on a first end 54*a* thereof and to one of PCBs 26, 28 at a second end 54*b* thereof. Fall down protection fastener 54 includes a cord 56 extending from a first end connector 58 to a second end connector 60. First end connector 58 is configured for being removably connected to channel base wall 16 and second end connector 60 is configured for being removably connected to one of PCBs 26, 28. End connector 58 includes a threaded section 59*a* for being screwed to threaded section 16*a* of channel base wall 16 and end connector 60 includes a threaded section 59*b* for being screwed to threaded section 27 of PCBs 26, 28. In the illustrated example, threaded sections 59*a*, 59*b* are formed as male connectors including external threads and threaded sections 16*a*, 59*b* are formed as female connectors including internal threads, but this arrangement can be reversed. The connection of fastener 54 to channel base wall 16 and PCB 26 or 28 prevents light inset 14 from being disconnected from channel 12 and falling to the ground in the event that connectors 38, 40 fail. In other embodiments, instead of a screw connection, the connectors 58, 60 can be welded or riveted to the channel base wall 16 and PCB 26, 28, respectively.

Luminaire 10 further includes an electrical driver 62 received in space 22 inside of channel 12. Electrical driver 62 connects to channel base wall 16 and electrically connects to PCBs 26, 28 to provide electricity to LEDs 30. Each PCB 26, 28 is provided with an electrical connector 64 for connecting to driver 62, directly via wiring or via wiring to another PCB 26, 28.

Figure 5:
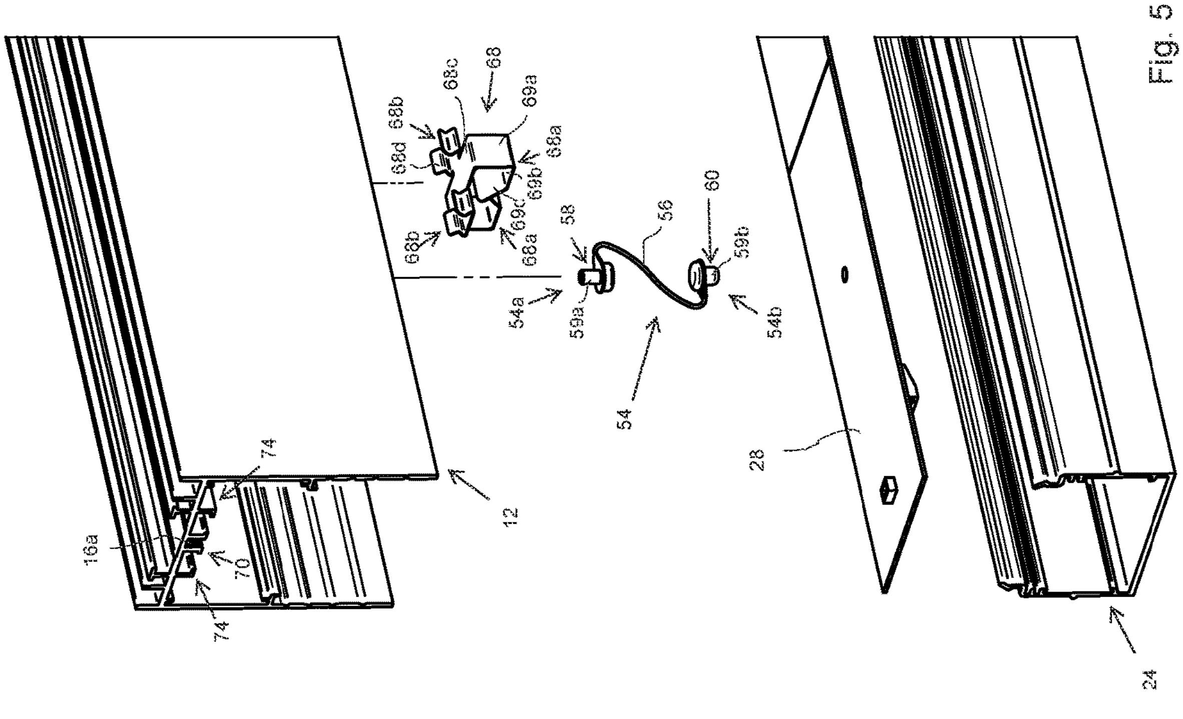
FIG. 5 shows a side exploded view of a portion of the linear luminaire shown in FIGS. 1*a* to 4*b.

As denoted in FIGS. 1*a* and 5, in order to organize the wires 66 for providing electricity from electrical driver 62 to LEDs 30, luminaire 10 includes a plurality of wire securing assemblies 68 each configured for being fixed to channel base wall 16 for securing wires 66 above light inset 14. Each wire securing assembly 68 includes two flexible arms 68*a* for receiving wires 66 and clips 68*b* for removably gripping a longitudinally extending support rail 70 fixed to channel base wall 16. Support rail 70 includes one or more threaded sections 16*a* integrally formed therein. Arms 68*a* face each other and each defines a receptacle 72 for receiving a subset of wires 66. Assembly 68 includes a base 68*c* for contacting support rail 70, and for contacting further rails 74 positioned on both lateral sides of rail 70. Two sets of clips 68*b* extend upward from opposite longitudinal sides of base 68*c*, and arms 68*a* extend downward from opposite lateral sides of base 68*c*. Each of clips 68*b* includes two prongs 68*d* for laterally contacting opposite sides of rail 70. Arms 68*a* each include a vertical section 69*a* extending downward from base 68*c*, a horizontal section 69*b* extending from the respective vertical section 69*a* toward the other arm 68*a*, and inclined section 69*c* extending upward from horizontal section 69*b* and horizontally toward the other arm 68*a*. Inclined sections 69*c* intersect each other to define an upside-down V-shape, as shown in FIG. 1*a*. Wires 66 are inserted into receptacles 72 by forcing wires 66 upward into the V-shape to force inclined sections 69*c* away from each other to define a gap between sections 69*c* for the wires 66 to pass through. After wires clear the intersection of sections 69*c*, the resiliency of arms 68*a* cause sections 69*c* to move back toward each other. The gap is eliminated and inclined sections 69*c* return into contact with each other.

A method for installing linear luminaire 10 includes fixing linear channel 12 to a support structure and inserting linear light inset 14 into channel 12 in a space 22 between the two channel side walls 18, 20 and connecting the linear light inset 14 to the channel 12 in the space by cover connectors 38, 40 of the linear light insert 14. Prior to the installation of light inset 14 into channel 12, PCBs 26 and/or PCBs 28 are slid in the longitudinal direction into respective gaps 52*a*, 52*b* and onto respective support sections 48, 50 of side walls 34, 36 such that PCBs 26 and/or PCBs 28 are connected to cover 24. As noted above, depending on whether or not the desired length of light insert 14 is an integer multiple of the length of PCBs 26, 28, solely PCBs 26 are used, solely PCBs 28 are used, or both at least one PCB 26 and at least one PCB 28 are used with one PCB 26 longitudinally overlapping with one PCB 28. It is noted that in one advantageous embodiment, PCBs 26 are exactly the same as PCBs 28.

After PCBs 26 and/or PCBs 28 are connected to cover 24 to form light inset 14, light inset 14 is inserted into the opening 42 defined at lower ends 18*a*, 20*a* of channel side walls 18, 20 with connectors 38, 40 leading the way. Insertion sections 39*d* of connectors 38, 40 are forced into respective channel connectors 44, 46 such that insertions sections 39*d* and outwardly extending sections 39*a* are forced laterally inward toward center plane $C_{CR}$ of cover 24 as outer tips 39*e* at an intersection of sections 39*a*, 39*d* are slid along the respective surfaces 45*c* and past respective surface 45*a*. After outer tips 39*e* pass the respective surfaces 41*a*, sections 39*a* move laterally outward to engage the respective surfaces 41*a* to hold inset 14 in channel 12. Surfaces 41*b* of inwardly extending sections 39*b* contact abutment surface 45*b* to align light inset 14 vertically in channel 12.

Prior to the installation of light inset 14 into channel, fall down protection fasteners 54 are connected to two or more of PCBs, PCBs 26, 28 by connecting end 60 to the respective PCB 26, 28. Each of cords 56 of fasteners 54 is elastically deformable to increase the distance between the respective ends 58, 60. This allows fasteners 54 to be stretched from the orientation shown in FIG. 5 to the orientation shown in FIGS. 4*a*, 4*b*. With end 60 connected to the respective PCB 26, 28 and light inset 14 spaced from the opening 42, end 58 is raised upward into space 22 of channel 12 and connected to base wall 16 of channel 12 by screwing end 58 into threaded section 16*a* of channel base wall 16. In the example shown in FIGS. 4*a*, 4*b*, fall down protection fasteners 54 are used to secure inset 14 to channel 12, one at each longitudinal end of luminaire 10. Then, light inset 14 is pushed upward into channel 12 and connected to channel 12 via connectors 38, 40.

The preceding specification refers to specific exemplary embodiments and examples. It will, however, be evident that various modifications and changes may be made thereto without departing from the broader spirit and scope as set forth in the claims that follow. The specification and drawings are accordingly to be regarded in an illustrative manner rather than a restrictive sense.

What is claimed is:

1. A linear luminaire comprising:

a linear channel defining an interior space; and a linear light inset configured for being inserted into the channel in the interior space, the light inset including a cover and a printed circuit board fixed to the cover, the printed circuit board supporting a plurality of light emitting diodes, the cover base wall including a translucent portion, the light emitting diodes arranged for emitting light through the translucent portion, the cover including two cover connectors, each of the cover connectors being configured for being snapped into the channel to hold the cover in the interior space, the cover connectors being on an opposite side of the printed circuit board as the translucent portion.

2. The linear luminaire as recited in claim 1 wherein the linear channel includes a channel base wall and two channel side walls extending away from the base wall, the cover including a cover base wall and two cover side walls extending away from the cover base wall, the printed circuit board being fixed to the two cover side walls, the cover base wall being the translucent portion, each of the cover connectors being fixed to a respective one of the two cover side walls.

3. The linear luminaire as recited in claim 2 wherein each of the cover connectors is formed integrally as a single piece with an end of the respective cover side wall.

4. The linear luminaire as recited in claim 2 wherein each of the two channel side walls includes a channel connector, each of the cover connectors configured for being snapped onto one of the channel connectors to create a form fit connection between the channel and the cover.

5. The linear luminaire as recited in claim 4 wherein each of the cover connectors includes an outwardly extending section extending away from a center of the printed circuit board that is configured for contact a securing surface of the respective channel connector to prevent the cover from falling out of the linear channel and away from the channel base wall, the securing surface facing toward the channel base wall.

6. The linear luminaire as recited in claim 5 wherein each of the cover connectors includes an inwardly extending section extending toward the center of the printed circuit board that is configured for contact an abutment surface of the respective channel connector to prevent the cover from being forced further into the linear channel toward the channel base wall, the abutment surface facing away from the channel base wall.

7. The linear luminaire as recited in claim 6 wherein the inwardly extending sections contact a surface of the printed circuit board facing away from the cover base wall.

8. The linear luminaire as recited in claim 6 wherein each of the cover connectors includes an intermediate section connecting the inwardly extending section to the outwardly extending section, each of the intermediate sections configured for laterally contacting an alignment surface of the respective channel connector to center the cover within the channel, the alignment surface facing toward each other.

9. The linear luminaire as recited in claim 6 wherein each of the cover connectors includes an insertion section tapering inward from the outwardly extending section toward the channel base wall and away from the printed circuit board.

10. The linear luminaire as recited in claim 1 wherein the cover includes a first support section supporting the printed circuit board and a second support section supporting a further printed circuit board.

11. The linear luminaire as recited in claim 1 wherein the cover includes a first support section supporting the printed circuit board and a second support section configured for supporting a further printed circuit board, the second support section and the first support section being different distances from the translucent portion.

12. The linear luminaire as recited in claim 1 further comprising the further printed circuit board, the second support section supporting the further printed circuit board, the first printed circuit board longitudinally overlapping the second printed circuit board.

13. The linear luminaire as recited in claim 1 further comprising a wire securing clip fixed to the channel base wall for securing wires away from the cover.

14. The linear luminaire as recited in claim 1 further comprising a fall down protection fastener fixed to printed circuit board and configured for being fixed to the channel base wall to prevent the cover and printed circuit board from being disconnected from the channel.

15. A linear luminaire comprising:

a linear channel defining an interior space; and a linear light inset configured for being inserted into the channel in the interior space, the light inset including a cover and a printed circuit board fixed to the cover, the printed circuit board supporting a plurality of light emitting diodes, the cover base wall including a translucent portion, the light emitting diodes arranged for emitting light through the translucent portion, the cover including a first support section supporting the printed circuit board and a second support section configured for supporting a further printed circuit board, the second support section and the first support section being different distances from the translucent portion.

16. The linear luminaire as recited in claim 15 further comprising the further printed circuit board, the second support section supporting the further printed circuit board, the first printed circuit board longitudinally overlapping the second printed circuit board.

17. A linear luminaire comprising:

a linear channel defining an interior space; and a linear light inset configured for being inserted into the channel in the interior space, the light inset including a cover and a printed circuit board fixed to the cover, the printed circuit board supporting a plurality of light emitting diodes, the cover base wall including a translucent portion, the light emitting diodes arranged for emitting light through the translucent portion, the cover including two cover connectors each configured for being connected to the channel to hold the cover in the interior space, a fall down protection fastener fixed to printed circuit board and configured for being fixed to the channel base wall to prevent the cover and printed circuit board from being disconnected from the channel upon failure of a connection of the cover connectors to the channel.

18. The linear luminaire as recited in claim 17 wherein the fall down protection fastener includes a first end for being connected to the channel, a second end connected to the printed circuit board and an elastically deformable cord extending between the first end and the second end that is stretchable to increase a distance between the first end and the second end.

* * * * *